July 11, 1950  O. N. BRYANT  2,514,931
REHEAT TURBINE CONTROL
Filed June 25, 1949  3 Sheets-Sheet 1

INVENTOR
Ozro N. Bryant
BY
A. B. Reeves
ATTORNEY

Patented July 11, 1950

2,514,931

UNITED STATES PATENT OFFICE 2,514,931

REHEAT TURBINE CONTROL

Ozro N. Bryant, Prospect Park, Pa., assignor to Westinghouse Electric Corporation, East Pittsburgh, Pa., a corporation of Pennsylvania Application June 25, 1949, Serial No. 101,339

3 Claims. (Cl. 60—73)

1

This application is a continuation-in-part of my application Serial No. 36,837, filed July 3, 1948, Patent No. 2,504,640, granted April 18, 1950.

The invention relates to a turbine installation in which superheated steam is supplied to a first or high-pressure turbine section and steam discharging from the latter is reheated and then supplied to a second or intermediate-pressure turbine section, and it has for an object to provide for operation of the throttle and the admission or governor valves in the supply connection of the first turbine section and of the interceptor valve in the supply connection of the second turbine section in response to turbine speed.

A further object of the invention is to provide, for an installation of the above character, a governing system consisting, in effect, of two governors, a normal or main one set to govern the turbine installation for normal speed and an auxiliary one set to supersede the first governor at a speed slightly higher than normal to take control of the admission valve to close the latter upon a further small percentage of increase in speed followed, in the event of slight additional increase in speed, by rapid closing of the interceptor valve.

Another object of the invention is to provide for operation of the interceptor valve of a reheat turbine installation both in response to a governor set for a speed higher than normal and to an emergency or autostop governor, the governor having the setting for a speed above normal being capable of opening and closing the interceptor valve, and the emergency or autostop governor operating, in the event of a predetermined overspeed, to close the interceptor valve as well as the throttle valve.

Another object of the invention is to provide a reheat turbine installation with an interceptor valve between the reheater and the section of the turbine supplied thereby together with a governor set for a speed above normal and effective to close the interceptor valve in the event of sudden drop in load to avoid increase in speed sufficient to operate the emergency or autostop governor.

The foregoing and other objects are effected by the invention as will be apparent from the following description and claims taken in connection with the accompanying drawings, forming a part of this application, in which:

Fig. 3 is a sectional detail view showing a throttle valve operating mechanism;

Fig. 4 is a diagram showing governor relations with respect to speed and load;

Figure 1:
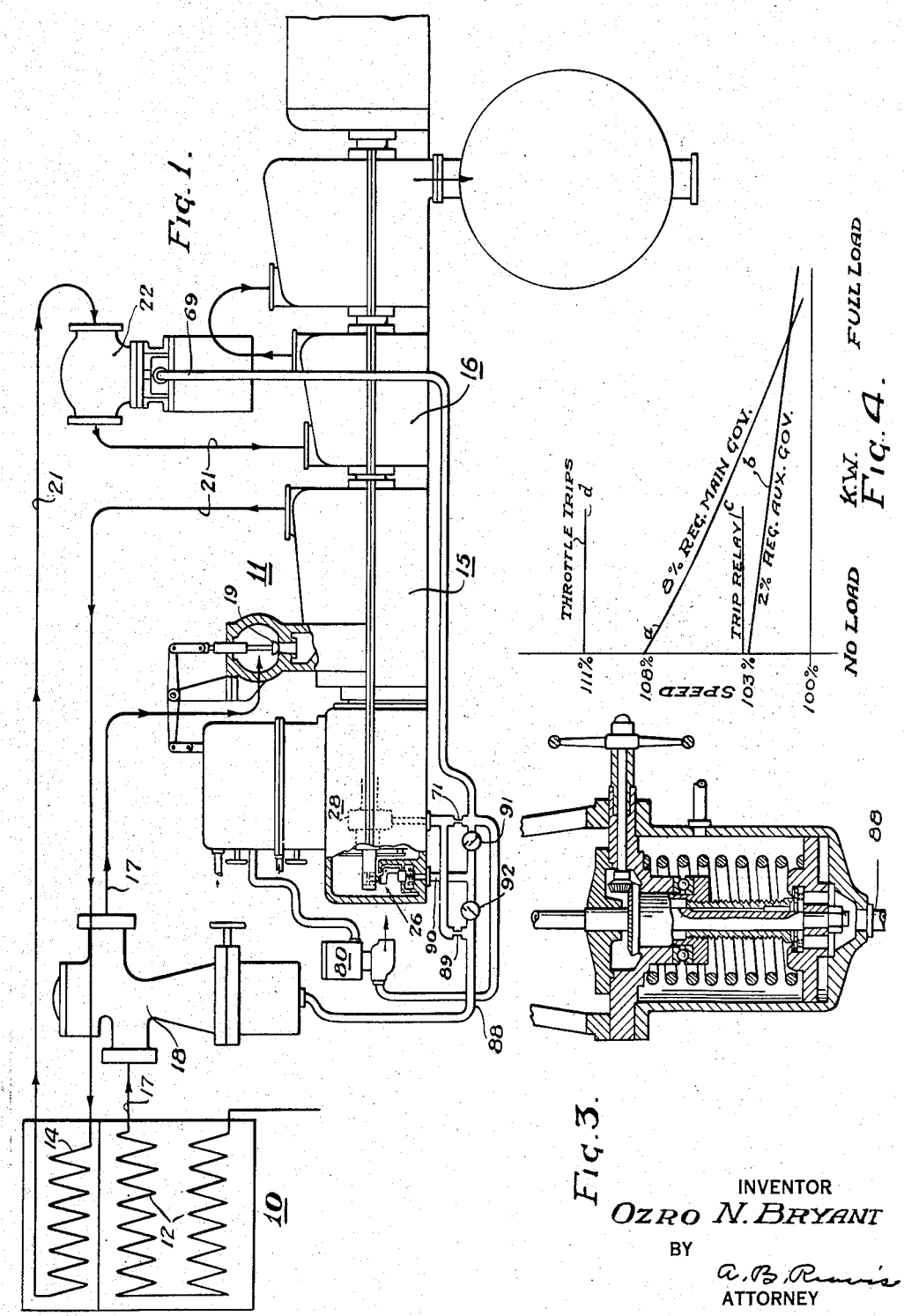
Fig. 1 is a diagrammatic view of a boiler and reheat turbine installation.

In the drawings there are shown a boiler installation, at 10, and a turbine installation, at 11.

The boiler installation includes a superheater 12 and a reheater 14.

The turbine installation comprises a first or high-pressure unit or section 15 and a second or intermediate-pressure section or unit 16.

A passage 17 delivers steam from the superheater to the high-pressure turbine section 15 and it includes a throttle valve 18 and a governor valve 19. A passage 21 conducts steam, exhausting from the high-pressure turbine section 15, through the reheater 14 to the intermediate-pressure turbine section 16, and an intercepting valve 22 is arranged between the reheater and the intermediate turbine section.

The governing or admission valve 19 and the interceptor valve 22 are operated in response to speed of the turbine installation. To this end, there are provided main and auxiliary governors, at 24, and, at 25, having force impressed thereon and varying substantially as the square of the speed and an autostop emergency governor, at 26, which is tripped upon attainment of a predetermined overspeed.

The main governor, at 24, is set for a normal speed and it operates to control the governing or admission valve 19. The auxiliary governor, at 25, is set for a slightly higher speed than the governor, at 24; and, because, as indicated in Fig. 4, the droop in speed for the auxiliary governor is less than that for the main governor, upon increase in speed of the installation to a predetermined small extent and within the governing range of the main governor, at 24, the latter is superseded by the auxiliary governor, at 25, not only to control the governing or admission valve but also, for slight increase in speed above that required to close the governor valve, to trip the intercepting valve 22 for closing.

Tripping of the autostop governor, at 26, brings about closing of the interceptor valve 22 and of the throttle valve 18.

The advantage of the auxiliary governor, at 25, is that it brings about rapid closing movement both of the governor and of the interceptor valves with only small increase in speed of the installation. For example, referring to Fig. 4, assuming that the main governor, at 24, has 8% regulation, that the auxiliary governor, at 25, has 2% regulation, secured by the hereinafter-described compensating feature, and that the speed changer of the auxiliary governor is set 1% higher than that of the main governor, then, upon the turbine speed reaching 101%, the auxiliary governor supersedes the main governor and closes the governor valve at 103% speed; and, upon slight additional increase in speed, rapid closure of the intercepting valve 22 is initiated. Just as soon as the speed drops below 103%, opening of the intercepting valve begins. Therefore, the auxiliary governor, at 25, takes care of transient or sudden load drops which might otherwise result in increase in speed, particularly on account of trapped steam, to an extent sufficient for tripping by the autostop governor, in which event, time is required for resetting of the latter and for restoration of the installation to the line. Hence, the auxiliary governor, at 25, guards against operation of the autostop or emergency governor and inconvenience caused thereby except when required by emergency speed conditions.

As shown, the primary governing force or pressure is developed by the impeller 28 carried by the turbine shaft and developing pressure of oil varying substantially as the square of the speed. The impeller delivers oil under pressure to the chambers 29 and 30 of the main and auxiliary transformer governs, at 24, and, at 25, for action on the pressure areas 31 and 32 of the heads 33 and 34 of the bellows elements 35 and 36. The bellows heads have thrust engagement with the stems 37 and 38 of the cup valves 39 and 40 covering escape ports 41 and 42 of spaces or passages 43 and 44 supplied by orifices 45 and 46 from a suitable oil pressure source. Springs 47 and 48 exert forces on the heads 33 and 34 so that each of the transformer governors has an equilibrium position with the primary or impeller fluid pressure force exerted on the bellows head balanced by the forces of the spring and of the secondary or transformed oil pressure acting on the cup valve and tending to open it.

The transformer governors, at 24, and, at 25, are provided with speed changers 50 and 51 so that the main governor, at 24, may be set for a normal operating speed and the auxiliary governor, at 25, may be set for a slightly higher speed. Also, the auxiliary governor, at 25, has a speed compensator to narrow its regulation so that the governor valve may be fully closed at a speed which is only a small percentage above normal and so that, with only a slight further increase in speed, the intercepting valve may be closed.

The speed corrector or compensator is preferably of the type illustrated and described in my Patent No. 2,323,115 of June 29, 1943. It comprises a piston 53 connecting the cup valve 40 and the stem 38, the piston providing a pressure area 54 opposing that of the cup valve 40 and exposed to pressure of liquid supplied by the passage 55 from the viscous orifice device, at 56, whose inlet is in communication with the space or passage, at 44. The orifice device provides for a pressure at 55 which is always proportional to the pressure at 44 dependent on the length of the helical viscous flow passage between the passage, at 44, and the passage, at 55. In operation, the governor, at 25, responds instantly to change in load with change in speed and the application of a proportional change of pressure to area 54 is effective to reduce the speed change due to load change. Therefore, the auxiliary governor, at 25, has, because of the compensating feature, a narrow percentage of regulation, and it is for this reason that it is capable, after superseding the main governor, at 24, of closing the governor valve upon a small percentage of increase in speed above normal and then, upon a slight additional increase in speed, to trip the interceptor valve for closing, whereby the governor and interceptor valves are controlled to prevent, pursuant to drop in load, over-speeding of the turbine installation sufficient to operate the autostop governor.

Superseding of the main transformer governor, at 24, by the auxiliary transformer governor, at 25, is effected by means of check valves 58 and 59 through which communication takes place with the control pressure passage or space 60 in which change in pressure is effective to operate the governor or admission valve 19 and to trip the interceptor valve 22 for closing movement. It will be apparent that the check valves provide for the maintenance of pressure in the space 60 which is the higher of the transformed pressures developed by the main and auxiliary governors, at 24, and, at 25. Therefore, when the turbine speed increases slightly above normal, for example, to 101%, the auxiliary governor, at 25, takes over control of the admission valve. As the regulation of the latter governor is small, further small increase in speed, for example, to 103%, suffices to close the governor valve 19 and a slight additional increase in speed trips the interceptor valve 22 for closing.

The governor valve 19 is of a conventional type and it is operated by the hereinafter-described servo-motor, at 62, having a relay 63 operative in response to pressure in the control passage or space 60.

The interceptor valve is opened and closed by means of any suitable servo-motor or operating device, for example, it may be of the type disclosed and claimed in the application of Meyer, Serial No. 60,278, filed November 16, 1948, or, as shown, it may comprise the servo-motor, at 64, including a cylinder 65, a piston 66 in the cylinder connected by means including its rod 67 to the valve, and a spring 68 exerting force on the piston 66 to close the valve. The intercepting valve 22 is opened by fluid under pressure supplied to the cylinder 65 and acting on the piston 66 against the spring 68. Fluid pressure for this purpose is provided in the space or passage 69 supplied through an orifice 71 from any suitable pressure source.

The space or passage 69 communicates with the cylinder 72 unitary and coaxial with the cylinder 65 and having a piston 73 therein. A hollow stem 74 depends from the piston 73, encompasses the rod 67, and is provided with a cup valve 75 at its lower end, the cup valve being in covering relation with respect to the ports 76 formed in the piston 66.

Increase in pressure in the cylinder 72 is effective to restrict the escape of liquid through the ports 76 from below the piston 66, in consequence of which the fluid pressure builds up below such piston and opens the intercepting valve.

Preferably, the piston 73 and the cup valve 75 define annular orifices 77 and 78 with respect to the rod to assure, with flow, of higher pressure tending to restrict the escape of liquid from below the piston than that tending to open the cup valve to provide for such escape. On the other hand, with decline in pressure in the space 69 and the cylinder 72, the spring 68 is effective to move the piston 66 downwardly, the pressure of liquid below the piston acting against the cup valve to open the latter, whereby liquid is permitted to escape to the space above the piston for discharge through the drain connection 79.

From the structure described, it will be apparent that drop in pressure in the space 69 renders the spring 68 effective to close the intercepting valve 22 wholly or partially. Therefore, when the pressure reaches a value corresponding to slightly more than 103% speed, the trip relay, at 80, is operated to release the pressure in the interceptor valve operating device pressure space. Also, the autostop governor operates to release such pressure.

The trip relay, at 80, is preferably comprised by a cylinder 81, a piston 82 in the cylinder connected to the valve 83, and a spring 84 exerting force on the piston to close the valve. As the passage 61 supplies liquid under control pressure to the cylinder for action on the piston 81 against the spring 84, it will be apparent that the latter may be set, for example, by the screw 85, for opening of the valve 83 when the control pressure reaches a value slightly in excess of that required for closing the governor or admission valve, whereupon the pressure in the space 69 is tripped or released and the spring 68 rapidly closes the interceptor valve 22.

In the event of overspeeding of the installation to the extent of about 10%, the autostop governor, at 26, is tripped to relieve suddenly the pressure in the space or passage 69, whereupon the interceptor valve rapidly closes. Also, operation of the autostop governor is effective to relieve the pressure in space 88, supplied by the orifice 89, for rapid closing of the throttle valve 18 so that, in the event of an emergency condition, both the throttle and interceptor valves are closed.

To provide for closing only of the interceptor valve in response to governor pressure and for closing of both the throttle and interceptor valves in response to autostop governor operation, the autostop line 90 is connected, through check valves 91 and 92, to the spaces 69 and 88 and which check valves are arranged to open to drop the pressure in both spaces when the pressure in line 90 is dumped by opening of the autostop valve.

The relative operations will be clearer from a consideration of Fig. 4, relating speed or cycles to load. In this view, lines $a$ and $b$ represent speed droop from no load to full load for the main and auxiliary governors; line $c$ represents speed for operation of trip relay 80; and line $d$ indicates speed for throttle valve tripping in response to emergency or autostop governor operation.

The servo-motor, at 62, for operating the governor valve 19 is more particularly disclosed and claimed in Schwendner Patent No. 2,224,321, granted December 10, 1940. It includes the operating piston 95 in the cylinder 96 and connected by the linkage 97 to the valve 19. The pressure-responsive relay, at 63, includes a pilot valve 98 for controlling the admission and exhaust of motive fluid to opposite sides of the operating piston 95. Governor pressure supplied to the space 60 acts on the piston 99 carried by the rod 100 extending from opposite sides thereof. The upper end of the rod is connected, through a tension spring 101, to the follow-up lever 102 pivotally connected to the operating piston and governor valve linkage. The lower end of the rod 100 carries a cup valve 104 covering the bore 105 formed in the pilot valve and in open communication with the drain passage 106.

The upper end of the pilot valve has a piston area 107 exposed to pressure in the chamber 108 supplied from a suitable pressure source through the orifice 109. Therefore, pressure in the chamber 108 exerts force on the pilot valve in the direction to move it away from the cup valve, while the spring 110 exerts force thereon in the direction to move the pilot valve toward the cup valve. It will be obvious, therefore, that the pilot valve seeks a position with the fluid pressure and spring forces balanced.

As the governing pressure force applied to the piston 99 is opposed by the force of the spring 101 acting thereon, upon a change in governing pressure supplied to the space 60, the piston 99 moves, in consequence of which the cup valve 104 is moved to change the pressure in the chamber 108 and thereby cause movement of the pilot valve, motion of the pilot valve following that of the cup valve. Thus, it will be seen that the pressure-responsive piston and cup valve, instead of being subjected to the load required to move the pilot valve, serve only to control the application of power for that purpose, whereby the pressure-responsive piston is relieved entirely of any resistance to movement of the pilot valve.

While ordinarily the apparatus so far specifically shown and described would restrict operation of the interceptor valve to the auxiliary governor, nevertheless, as the passage 61 communicates with the space 60, the main governor 24 may, under certain conditions, such as a lower load setting or system frequency variation, develop sufficient pressure to release the interceptor valve. To avoid this undesired possibility, in Figs. 5 and 6, the trip relay pressure supply passages 61a and 61b, instead of communicating with the pressure space 60 supplied by either governor, are respectively connected to the auxiliary governor pressure spaces 44 and 44a at the governor side of check valves 59 and 59a. By this means, the trip relay, at 80 or at 80a, is removed entirely from the possibility of any influence by the main governor.

Figure 2:
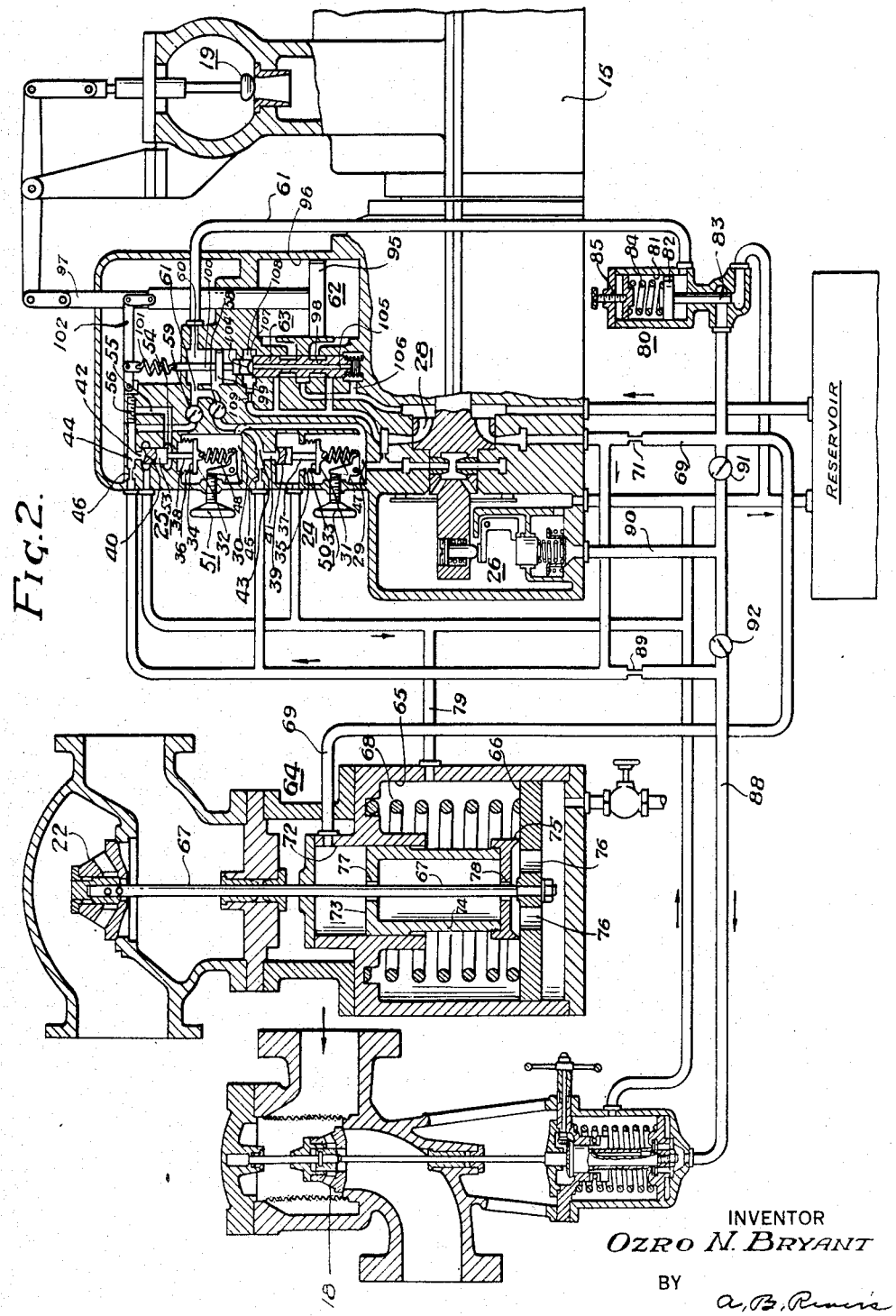
Fig. 2 is a sectional view of the turbine control mechanism, including the main and auxiliary governors and the throttle, admission and intercepting valves.
Figure 5:
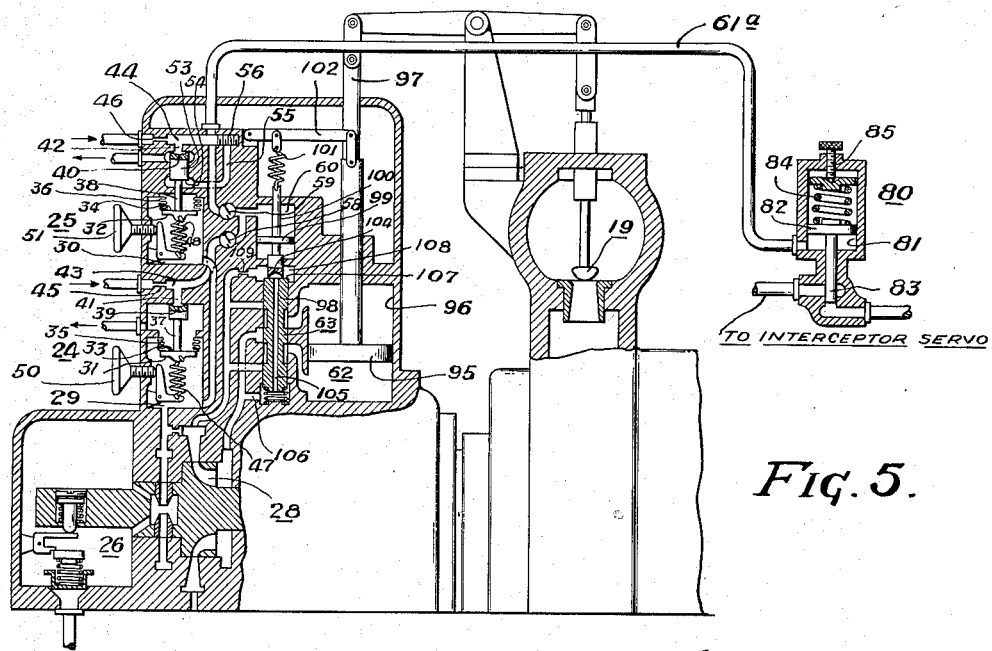
Fig. 5 is a sectional view showing main and auxiliary governors similar to Fig. 2 except for the modified and preferred interceptor connection.
Figure 6:
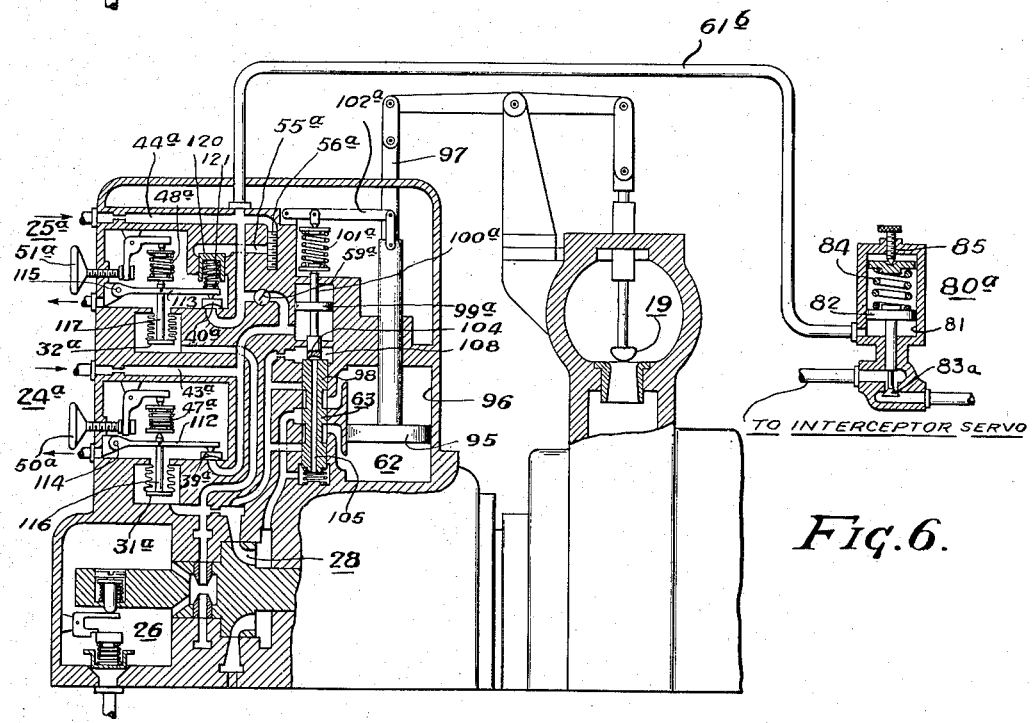
Fig. 6 is a sectional view showing main and auxiliary governors of the inverse type.

Fig. 6 shows a form of the invention wherein the governor pressures change inversely in relation to speed. In Figs. 2 and 5, increase in speed is accompanied by increase in impeller or primary pressure and increase in secondary or governor pressure, the change in secondary or governor pressure being maintained in proportional relation to primary pressure change. Proportionality of pressure changes also exists where the changes are in inverse relation, that is, if the primary pressure increases incident to an increase in speed, the secondary pressure decreases and vice versa.

An inverse arrangement is shown in Fig. 6. As compared to the direct arrangement, the inverse one involves certain mechanical changes to establish the inverse relation and modification of the interceptor valve trip relay.

Referring more particularly to Fig. 6, the main and auxiliary governors 24a and 25a, include levers 112 and 113 fulcrumed at 114 and 115. The outer ends of the levers engage cup valves 39a and 40a. The pressure abutments 31a and 32a, subject to primary or impeller pressure, exert forces, through the thrust rods 116 and 117, on the levers 112 and 113 in opposition to forces of the springs 47a and 48a exerted thereon, the spring forces being subject to adjustment by the speed changes at 50a and 51a.

Since the main and auxiliary governors are similar, except for the compensating or speed adjusting feature of the auxiliary governor, the description of the operation of one will suffice for both. Assuming an increase in impeller pressure due to an increase in turbine speed, the increase in such pressure acting on the area 31a exerts force on the lever 112 in the direction to move the latter upwardly against the force of the spring 47a thereby reducing the force or pressure of the spring tending to move the cup valve 39a in the direction to increase the secondary pressure in the space or passage 43a in consequence of which the secondary pressure in such space will be decreased. Thus, a change in primary or impeller pressure is accompanied by a proportional or inverse change in secondary pressure, the relationship of the changes being fixed by the pressure areas of the abutment 31a and of the cup valve 39a.

In the inverse arrangement shown, governor pressure is applied below the relay pressure-responsive piston 99a and the rod 100a abuts a compression spring 101a engaging the follow-up lever 102a.

Instead of the speed-correcting pressure in the passage 55 supplied from the viscous orifice 56 being applied directly to the cup valve to move the latter in the direction to effect a further change in secondary pressure, as in Fig. 2, in Fig. 6, the passage 55a, supplied from the secondary pressure space 44a through the viscous orifice device 56a, applies pressure to a piston 120 engaging one end of the spring 121 whose other end engages the lever 113 to exert closing force on the cup valve 40a.

The modified form of speed-corrector or compensator in Fig. 6 operates as follows: Assuming a reduction in load and an increase in impeller pressure incident to increase in speed, the secondary pressure decreases proportionally; however, the speed change required for the load change is reduced by applying a proportional part of the pressure change to the piston 120, in consequence of which the force exerted by the spring 121 on the cup valve in the closing direction of the latter will be reduced, thus effecting further decrease in secondary pressure, so that, for a given change in secondary pressure, a smaller change in impeller or primary pressure is required, that is, the speed change for the load change is reduced.

Since, with the inverse arrangement shown in Fig. 6, a drop in load is accompanied by a decrease in secondary or governing pressure, the trip valve 83a is arranged, upon sufficient drop in pressure, to release the pressure holding the interceptor valve open. To this end, the trip valve 83a of Fig. 6 is reverse of the trip valve 83 shown in Figs. 2 and 5, that is, instead of drop in pressure resulting in closing of the valve 83, as in Figs. 2 and 5, in Fig. 6, drop in pressure results in opening of the valve 83a.

From the foregoing, it will be apparent that I have provided admission and interceptor valves for a reheat turbine installation with the admission valve controlled by a main governor for normal speed operation together with an auxiliary governor having a slightly higher speed setting than the main governor and arranged, upon slight increase in speed above normal, to supersede the latter so that, with a small further increase in speed, the governor valve may be closed; and, with a slight additional increase in speed, the relay, at 80 or 80a, may be tripped to bring about rapid closing of the interceptor valve. The autostop governor not only closes the throttle valve but also the interceptor valve. The auxiliary governor, therefore, operates to keep the reheat turbine installation under control with load drops which might otherwise result in operation of the autostop governor with the inherent inconvenience of the latter so far as restoring the installation to the line is concerned.

While the invention has been shown in a plurality of forms, it will be obvious to those skilled in the art that it is not so limited, but is susceptible of various changes and modifications without departing from the spirit thereof.

What is claimed is:

1. In a turbine installation wherein superheated steam is supplied to a first turbine section and the steam discharging from the latter is reheated and then supplied to a second turbine section, the combination of, main and auxiliary governors driven by the turbine; means including an emergency governor for shutting off the supply of steam to the turbine upon the attainment of a predetermined overspeed; a governor valve in the supply connection of the first turbine section and controlled in response to said main and auxiliary governors; an interceptor valve in the reneated steam supply connection of the second turbine section; means for biasing the interceptor valve to closed position; means for holding the interceptor valve open against the biasing means; speed changers for the main and auxiliary governors; means providing for small speed droop of the auxiliary governor relative to the main governor so that, with the auxiliary governor speed changer set for a slightly higher speed than the main governor speed changer and the attainment of sufficient turbine speed, the auxiliary governor takes control of the turbine; and means responsive solely to the auxiliary governor at a turbine speed in excess of that required for it to close the governor valve, but below that required for emergency governor operation, to release said means for holding the interceptor valve open.

2. In a turbine installation wherein superheated steam is supplied to a first turbine section and the steam discharging from the latter is reneated and then supplied to a second turbine section, the combination of, main and auxiliary governors driven by the turbine and each operative to provide a control pressure which varies directly as a function of turbine speed; means including an emergency governor for shutting off the supply of steam to the turbine upon the attainment of a predetermined overspeed; a governor valve in the supply connection of the first turbine section; an interceptor valve in the reheated steam supply connection for the second turbine section; means for biasing the interceptor valve to closed position; means for holding the interceptor valve open against the biasing means; a servo-motor responsive to the higher of said control pressures to control the governor valve; pressure-responsive means for releasing said means for holding the interceptor valve open; means including a check valve for restricting response of said pressure-responsive means to the auxiliary governor control pressure; speed changers for the main and auxiliary governors; and means providing for small speed droop of the auxiliary governor relative to the main governor so that, with the auxiliary governor speed changer set for a slightly higher speed than the main governor speed changer and the attainment of sufficient turbine speed, the auxiliary governor control pressure takes control of the turbine and, at a turbine speed in excess of that required to close the governor valve, but below that required for emergency governor operation, renders the pressure-responsive means effective to release said means for holding the interceptor valve open.

3. In a turbine installation wherein superheated steam is supplied to a first turbine section and the steam discharging from the latter is reheated and then supplied to a second turbine section, the combination of, main and auxiliary governors driven by the turbine and each operative to provide a control pressure which varies inversely as a function of turbine speed; means including an emergency governor for shutting off the supply of steam to the turbine upon the attainment of a predetermined overspeed; a governor valve in the supply connection of the first turbine section; an interceptor valve in the reheated steam supply connection of the second turbine section; means for biasing the interceptor valve to closed position; means for holding the interceptor valve open against the biasing means; a servo-motor responsive to the lower one of said governor control pressures to control the governor valve; pressure-responsive means for releasing the holding means; means including a check valve for restricting response of said pressure-responsive means to auxiliary governor control pressure; speed changers for the main and auxiliary governors; and means providing for small speed droop of the auxiliary governor relative to the main governor so that, with the auxiliary governor speed changer set for a slightly higher speed than the main governor speed changer and the attainment of sufficient turbine speed, the auxiliary governor control pressure takes control of the turbine and at a turbine speed in excess of that required for closing the admission valve, but below that required for emergency governor operation, renders said pressure-responsive means effective to release said means for holding the interceptor valve open.

OZRO N. BRYANT.

REFERENCES CITED

The following references are of record in the file of this patent:

UNITED STATES PATENTS

| Number | Name | Date |
| --- | --- | --- |
| 2,504,640 | Bryant | Apr. 18, 1950 |